US011740507B2

(12) United States Patent
Li et al.

(10) Patent No.: US 11,740,507 B2
(45) Date of Patent: Aug. 29, 2023

(54) SUPPORT BRACKET, BACKLIGHT MODULE, AND DISPLAY SCREEN

(71) Applicant: BEIJING XIAOMI MOBILE SOFTWARE CO., LTD., Beijing (CN)

(72) Inventors: Jinze Li, Beijing (CN); Zhendong Zhou, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 90 days.

(21) Appl. No.: 17/204,086

(22) Filed: Mar. 17, 2021

(65) Prior Publication Data

US 2022/0011634 A1 Jan. 13, 2022

(30) Foreign Application Priority Data

Jul. 13, 2020 (CN) ......................... 202010670827.9

(51) Int. Cl.
*G02F 1/13357* (2006.01)
*G02F 1/1333* (2006.01)

(52) U.S. Cl.
CPC .. *G02F 1/133608* (2013.01); *G02F 1/133314* (2021.01); *G02F 1/133605* (2013.01)

(58) Field of Classification Search
CPC ........... G02F 1/133608; G02F 1/13357; G02F 1/133314; G02F 1/1333; G02F 1/133605; G02F 1/133615; G02F 1/133308; G02F 1/133305; G02F 1/133553; G02F 1/1335; G02F 1/133603
See application file for complete search history.

(56) References Cited

U.S. PATENT DOCUMENTS

| | | | | |
|---|---|---|---|---|
| 9,778,411 | B2 * | 10/2017 | Yuki | G02B 6/0088 |
| 10,670,917 | B2 * | 6/2020 | Yasunaga | G02F 1/133611 |
| 11,366,348 | B2 * | 6/2022 | Son | G02F 1/133331 |
| 2022/0171120 | A1 * | 6/2022 | Cai | G02B 6/0051 |

FOREIGN PATENT DOCUMENTS

| | | | |
|---|---|---|---|
| CN | 111123572 | A | 5/2020 |
| CN | 111240089 | A | 6/2020 |
| JP | 2014191114 | A | 10/2014 |

(Continued)

OTHER PUBLICATIONS

Indian Patent Application No. 202144013060 Office Action dated Feb. 3, 2022, 5 pages.

(Continued)

*Primary Examiner* — Arman B Fallahkhair
(74) *Attorney, Agent, or Firm* — COZEN O'CONNOR

(57) ABSTRACT

The present disclosure relates to a support bracket, a backlight module, and a display screen. The support bracket is provided with a mounting cavity penetrating in a given direction, and includes a frame and a projecting member. The frame is connected to a light-emitting assembly in the backlight module. The projecting member is connected to the frame, projects towards the mounting cavity, and supports the light-emitting assembly in the backlight module. The projecting member is provided with a first light-transmission hole, and an axial direction of the first light-transmission hole is parallel to the given direction.

18 Claims, 8 Drawing Sheets

(56) References Cited

FOREIGN PATENT DOCUMENTS

WO WO 2017190548 A1 11/2017

OTHER PUBLICATIONS

European Patent Application No. 21164778.9 extended Search and Opinion dated Jul. 21, 2021, 9 pages.
Japanese Patent Application No. 2021-047113, Office Action dated May 10, 2022, 5 pages.
Japanese Patent Application No. 2021-047113, English translation of Office Action dated May 10, 2022, 5 pages.
Korean Patent Application No. 10-2021-0038725, Office Action dated Jun. 28, 2022, 5 pages.
Korean Patent Application No. 10-2021-0038725, English translation of Office Action dated Jun. 28, 2022, 6 pages.

* cited by examiner

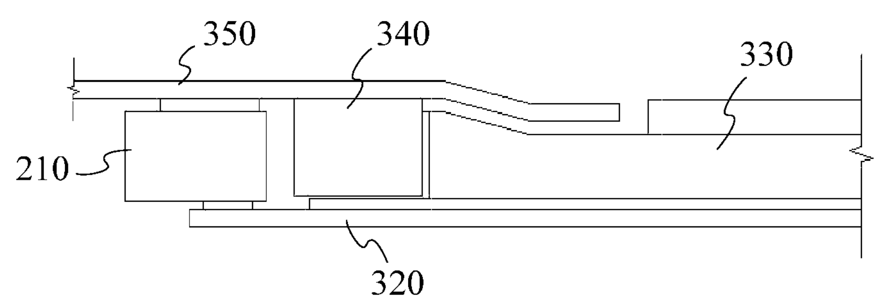

FIG. 12

```
┌──────────────────────────────────────────┐
│ placing a reflecting member in a         │─── S131
│ light-emitting assembly on a support     │
│ portion of a projecting member           │
└──────────────────────────────────────────┘
                    │
                    ▼
┌──────────────────────────────────────────┐
│ connecting the reflecting member to a    │─── S132
│ bottom wall of a frame                   │
└──────────────────────────────────────────┘
```

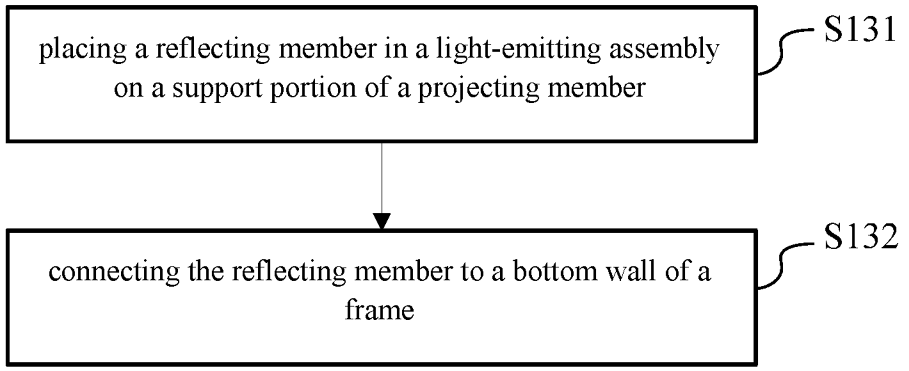

FIG. 13

```
┌──────────────────────────────────────────┐
│ placing a light source and a flexible    │─── S133
│ circuit board into a mounting cavity of  │
│ the support frame from top of the        │
│ support frame                            │
└──────────────────────────────────────────┘
                    │
                    ▼
┌──────────────────────────────────────────┐
│ connecting the flexible circuit board to │─── S134
│ a bottom wall of a second segment        │
└──────────────────────────────────────────┘
```

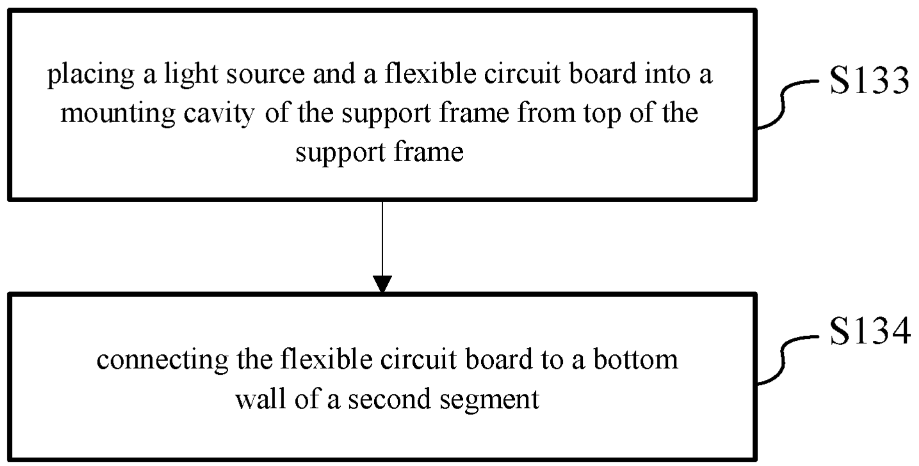

FIG. 14

SUPPORT BRACKET, BACKLIGHT MODULE, AND DISPLAY SCREEN

CROSS-REFERENCE TO RELATED APPLICATION

This application is based on and claims priority to Chinese Patent Application No. 202010670827.9, filed on Jul. 13, 2020, the entire content of which is incorporated herein by reference.

FIELD

The present disclosure relates to a field of a liquid crystal display screen, and more particularly to a support bracket, a backlight module, and a display screen.

BACKGROUND

In order to optimize the user experience, a display area of a display screen is getting larger and larger, which is usually achieved by increasing a screen-to-body ratio of the display screen and increasing the size of the display screen.

For the liquid crystal display, the screen-to-body ratio can be increased by providing a light-transmission hole inside the display screen. In this case, a part of the display screen corresponding to the light-transmission hole is configured to be fitted with a camera or another module, and does not display images, while a corresponding part of the display screen around the light-transmission hole can display images. However, increasing the size of the liquid crystal display screen will increase the weight of the display screen, thereby increasing the overall weight of an electronic device. As such, it is not convenient for a user to hold or carry the electronic device for a long time.

SUMMARY

The present disclosure provides a support bracket, a backlight module, and a display screen.

A support bracket according to a first aspect of embodiments of the present disclosure is configured for a backlight module, and provided with a mounting cavity penetrating in a given direction. The support bracket includes: a frame connected to a light-emitting assembly of the backlight module; and a projecting member connected to the frame, projecting towards the mounting cavity, and supporting the light-emitting assembly in the backlight module. The projecting member is provided with a first light-transmission hole, and an axial direction of the first light-transmission hole is parallel to the given direction.

A backlight module according to a second aspect of embodiments of the present disclosure includes a light-emitting assembly and a support bracket. The support bracket is provided with a mounting cavity penetrating in a given direction. The support bracket includes: a frame connected to a light-emitting assembly of the backlight module; and a projecting member connected to the frame, projecting towards the mounting cavity, and supporting the light-emitting assembly in the backlight module. The projecting member is provided with a first light-transmission hole, and an axial direction of the first light-transmission hole is parallel to the given direction. The light-emitting assembly is arranged in the mounting cavity of the support bracket, and is connected to the frame of the support bracket. The light-emitting assembly is provided with a second light-transmission hole, and is overlapped on the projecting member of the support bracket in such a manner that the second light-transmission hole is in communication with the first light-transmission hole in the support bracket.

A display screen according to a third aspect of embodiments of the present disclosure includes a backlight module. The backlight module includes a light-emitting assembly and a support bracket. The support bracket is provided with a mounting cavity penetrating in a given direction. The support bracket includes: a frame connected to a light-emitting assembly of the backlight module; and a projecting member connected to the frame, projecting towards the mounting cavity, and supporting the light-emitting assembly in the backlight module. The projecting member is provided with a first light-transmission hole, and an axial direction of the first light-transmission hole is parallel to the given direction. The light-emitting assembly is arranged in the mounting cavity of the support bracket, and is connected to the frame of the support bracket. The light-emitting assembly is provided with a second light-transmission hole, and is overlapped on the projecting member of the support bracket in such a manner that the second light-transmission hole is in communication with the first light-transmission hole in the support bracket.

BRIEF DESCRIPTION OF THE DRAWINGS

The drawings are incorporated into the specification and constitute a part of the specification, showing embodiments in accordance with the present disclosure, and together with the specification are used to explain the principle of the present disclosure.

FIGS. 4-1 to 4-3 are partial cross-sectional views of a support bracket according to different illustrative embodiments of the present disclosure.

FIG. 7-1 is a top view of a backlight module according to an illustrative embodiment of the present disclosure.

FIG. 7-2 is a bottom view of a backlight module according to an illustrative embodiment of the present disclosure.

FIG. 12 is a cross-sectional view of a backlight module along a height direction according to another illustrative embodiment of the present disclosure.

FIG. 13 is a flow chart of an assembling method of a backlight module according to an illustrative embodiment of the present disclosure.

FIG. 14 is a flow chart of an assembling method of a backlight module according to another illustrative embodiment of the present disclosure.

DETAILED DESCRIPTION

Figure 1:
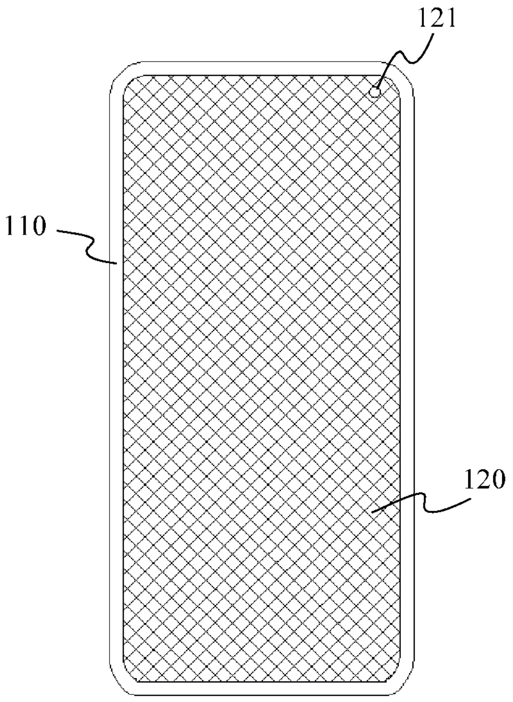
FIG. 1 is a schematic view of a support bracket in the related art.

Here, illustrative embodiments will be described in detail, and examples thereof are illustrated in the drawings. When the following description refers to the drawings, unless otherwise indicated, the same numbers in different drawings indicate the same or similar elements. The implementations described in the following illustrative embodiments do not represent all implementations consistent with the present disclosure. Rather, they are merely examples of devices and methods consistent with some aspects of the present disclosure as detailed in the appended claims.

The terms used in the present disclosure are only for the purpose of describing specific embodiments, not intended to limit the present disclosure. Unless otherwise defined, the technical terms or scientific terms used in the present disclosure shall have the usual meanings understood by those with ordinary skills in the field to which this disclosure belongs. The "one" or "a" or other similar words used in the specification of the present disclosure and the claims do not mean limit of quantity, but mean that there is at least one. Unless otherwise stated, "including" or "comprising" or other similar words mean that the elements or objects before "including" or "comprising" contains the elements or objects or their equivalents listed after "including" or "comprising", and other elements or objects are not excluded. Similar words such as "connection" or "connect" are not limited to physical or mechanical connections, and may include electrical connections, no matter whether direct or indirect. The singular forms of "a", "the" and "this" used in the specification and claims of this disclosure are also intended to include plural forms, unless the context clearly indicates other meanings. It should also be understood that the term "and/or" as used herein refers to any or all possible combinations of one or more associated listed items.

Before describing the solutions provided by the embodiments of the present disclosure, it is first clarified that, in the following description, directions such as upper, lower, top, and bottom are all referred to a use direction of a display screen. Specifically, a side of the display screen displaying an image is "upper" or "top", and another side of the display screen located inside an electronic device is "lower" or "bottom".

A liquid crystal display screen includes a backlight module, a display panel, and a protective cover arranged sequentially from bottom to top. The backlight module is configured to output lights, and serves as a light source of the liquid crystal display screen. The display panel has several pixel points, and each pixel point has a liquid crystal layer and a drive layer. The drive layer applies an electric field to the liquid crystal layer to control the liquid crystal to reverse, so that the light output from the backlight module can pass through the liquid crystal layer or be shielded by the liquid crystal layer. Accordingly, the pixel points can illuminate or be extinguished, and then an image display can be realized. The protective cover covers the display panel and plays a protective role.

The backlight module includes a light-emitting assembly for outputting lights, and a support bracket for mounting the light-emitting assembly.

FIG. 1 is a schematic view of a support bracket in the related art. As illustrated in FIG. 1, the support bracket includes a frame 110 and a base plate 120 connected to the frame 110. The frame 100 encloses a cavity, the base plate 120 closes one face of the cavity, and the other face of the cavity opposite to the base plate 120 is open.

The light-emitting assembly is provided in the cavity enclosed by the frame 110, and is placed on the base plate 120. That is, the base plate 120 serves to carry the light-emitting assembly. Usually, the base plate 120 is selected as a metal plate (such as an iron plate, an aluminum plate, etc.).

In order to improve a screen-to-body ratio of the display screen, the backlight module is provided with a light-transmission hole running through a light guiding assembly and the base plate 120 from top to bottom (the light-transmission hole in the base plate 120 is indicated by reference sign 121 in FIG. 1). The light-transmission hole is fitted with a front camera in the electronic device, and rest of the display screen except a part thereof corresponding to the light-transmission hole can display images normally.

Further, in some embodiments, as a compromise between a high screen-to-body ratio and a low weight, thicknesses of the protective cover of the liquid crystal display screen and/or the base plate in the display panel are reduced.

However, in an embodiment of the present disclosure, as the compromise between the high screen-to-body ratio and the low weight of the liquid crystal display screen, a different solution is provided. Specifically, a support bracket, a backlight module, and an assembling method, a display screen, and an electronic device are provided. A detailed description is presented with reference to the drawings in the following.

Figure 2:
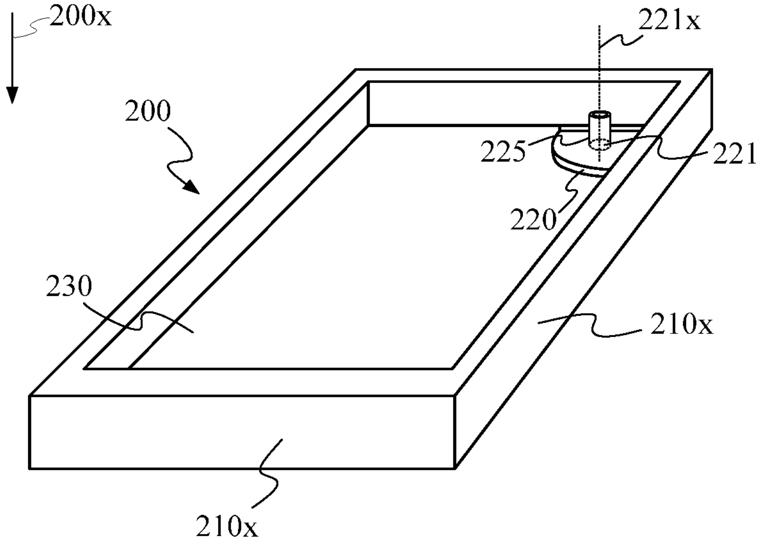
FIG. 2 is a perspective view of a support bracket according to an illustrative embodiment of the present disclosure.
Figure 3:
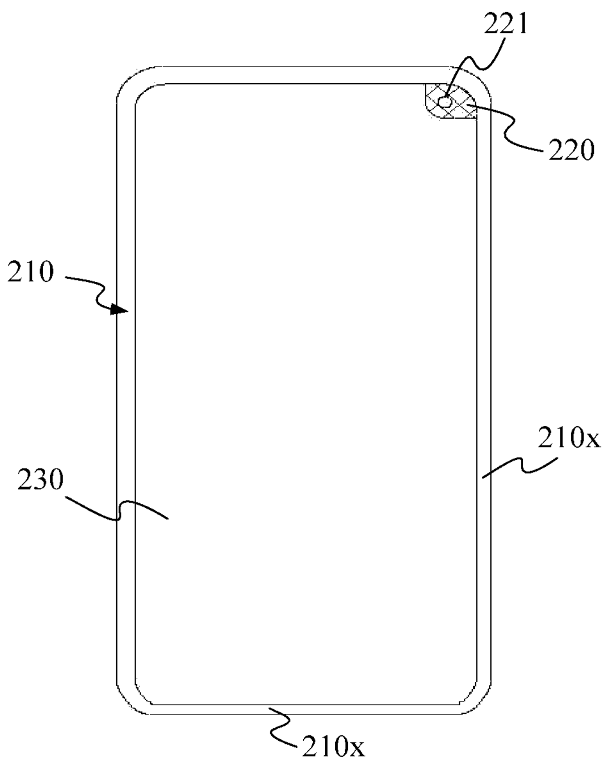
FIG. 3 is a top view of a support bracket according to an illustrative embodiment of the present disclosure.
Figures 1, 4:
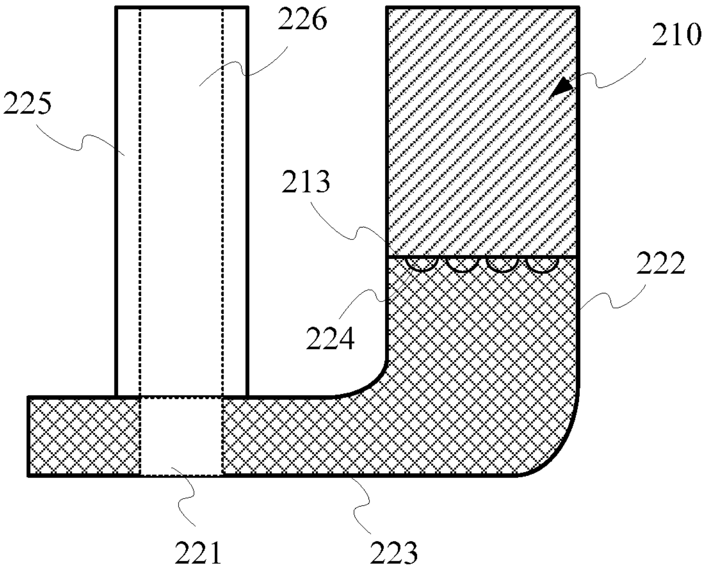
Figures 2, 4:
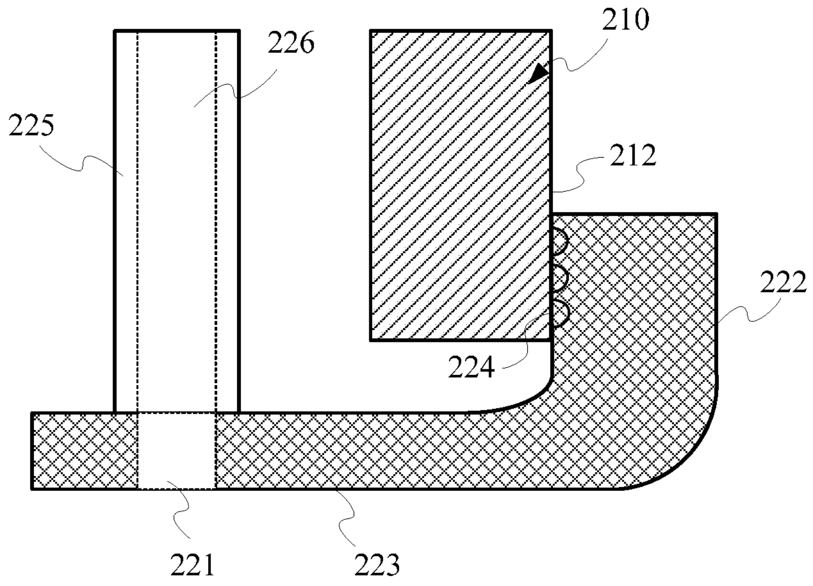
Figures 3, 4:
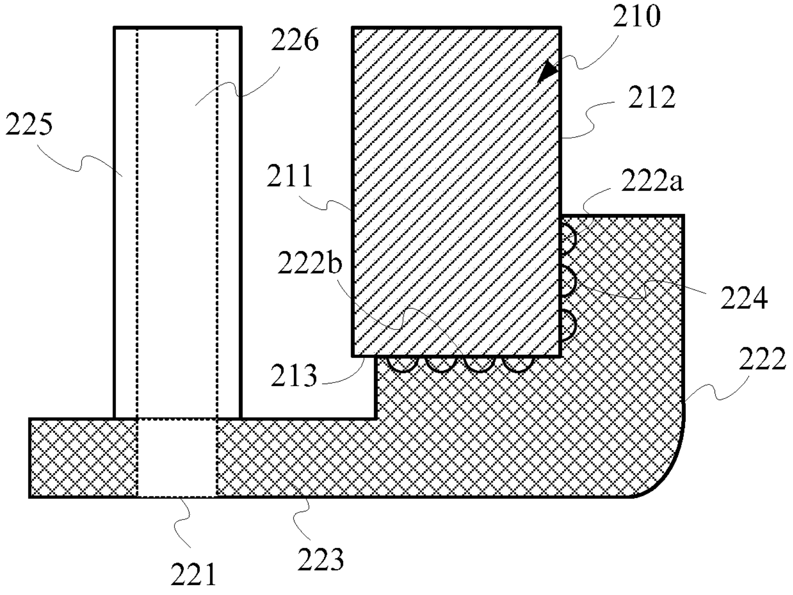

FIG. 2 is a perspective view of a support bracket according to an illustrative embodiment of the present disclosure, and FIG. 3 is a top view of a support bracket according to an illustrative embodiment of the present disclosure. FIGS. 4-1 to 4-3 are partially cross-sectional views of a support bracket according to different illustrative embodiments of the present disclosure.

Embodiment of the present disclosure provides a support bracket used in the backlight module, and the support bracket is specifically used for supporting the light-emitting assembly in the backlight module.

As illustrated in FIG. 2, a support bracket 200 is provided with a mounting cavity 230 penetrating along a given direction 200*x*. The mounting cavity 230 penetrates along an up-and-down direction when the backlight module including the support bracket 200 is used in the display screen.

The support bracket 200 specifically includes a frame 210 configured to be connected to the light-emitting assembly of the backlight module. In combination with FIG. 3, the frame 210 includes four sides 210*x* connected end-to-end so as to enclose the mounting cavity 230.

The support bracket 200 further includes a projecting member 220 used for supporting the light-emitting assembly. The projecting member 220 is connected to the frame 210 and projects to the mounting cavity 230. In some embodiments, the projecting member 220 is connected to at least one side 210*x* of the frame 210.

There is no specific limitation to the location of the projecting member 220. For example, the projecting member 220 is arranged at a joint of two sides 210*x* of the frame 210, and is connected to the two sides 210*x* of the frame 210 (as illustrated in FIG. 3). Or, the projecting member 220 is arranged to one side 210*x* of the frame 210, and is connected to the one side 210*x* of the frame 210.

In an example, in combination with FIGS. 4-1 to 4-3, the frame 210 includes an inner wall 211 facing towards the mounting cavity (not shown in these figures), an outer wall 212 opposite to the inner wall, as well as a bottom wall 213 and a top wall connected to the inner wall 211 and the outer wall 212. The projecting member 220 includes a connection part 222 and a support part 223, and the connection part 222 is connected to the outer wall 212 and/or the bottom wall 213 of the frame 210.

As illustrated in FIG. 4-1, the connection part 222 is connected to the bottom wall 213 of the frame 210. As illustrated in FIG. 4-2, the connection part 222 is connected to the outer wall 212 of the frame 210. Or, as illustrated in FIG. 4-3, the connection part 222 has a side wall 222*a* and an end face 222*b* connected to each other, the side wall 222*a* is connected to the outer wall 212 of the frame 210, and the end face is connected to the bottom wall 213 of the frame 210.

In some embodiments, the frame 210 is a plastic frame, and the projecting member 220 is a metal member. In this case, the projecting member 220 is connected to the frame 210 by an adhesive, or the projecting member 220 and the frame 210 are formed by injection molding. In order to ensure a firm connection between the projecting member 220 and the projecting member 220, a glue hole 224 is formed in a portion of the connection part 222 connected to the frame 210. In the process of gluing or injection molding, an adhesive or a resin for the injection molding of the frame 210 may enter the glue hole 224. Thus, a connection area of the connection part 222 and the frame 210 can be increased by the glue hole 224, and the connection strength of the frame 210 and the projecting member 220 can be improved. The higher the density of the glue holes 224, the stronger the connection stability between the projecting member 220 and the frame 210.

The connection part 222 extends away from the frame 210, that is, the connection part 222 extends downwards. In this case, the support part 223 connected to the connection part 222 can be arranged below the bottom wall 213. Further, the support part 223 projects towards the mounting cavity 230. In this way, the support part 223 can stably carry the light-emitting assembly.

In an embodiment of the present disclosure, the projecting member 220 projects towards the mounting cavity 230 without closing the mounting cavity 230. That is, the projecting member 220 forms a partial bottom plate of the support bracket 200. This significantly reduces a physical structure of the support bracket, thereby reducing the material used for the support bracket so as to reduce the weight of the support bracket. Thus, the weight of the liquid crystal display screen using the backlight module can be reduced.

In an embodiment, continuing to refer to FIG. 2, the projecting member 220 is provided with a first light-transmission hole 221, and an axial direction 221*x* of the first light-transmission hole 221 is parallel to the given direction 200*x*. When the axial direction of the first light-transmission hole 221 is approximately parallel to the given direction 200*x* (for example, an included angle between the axial direction 221*x* and the given direction 200*x* is less than or equal to 10°), it is also considered that the axial direction 221*x* of the first light-transmission hole 221 is parallel to the given direction 200*x*.

In this way, the first light-transmission hole 221 can be fitted with an optical module (such as a camera, an infrared transmitter, etc.) arranged below the support bracket 200 in the electronic device, so that the optical module can receive the light passing through the first light-transmission hole 221. Thus, this backlight module can be fitted with the display panel with a high screen-to-body ratio. It should also be noted that, compared with the manner of directly providing the light-transmission hole in the frame 210, the manner of providing the first light-transmission hole 221 in the projecting member 220 does not increase the width of the side 210*x* of the frame 210. Thus, the width of the black rim of the display screen having the support bracket 200 can be reduced, and the screen-to-body ratio of the display screen can be further increased.

In some embodiments, in combination with FIG. 3, the support part 223 is provided with the first light-transmission hole 221. A distance from the first light-transmission hole 221 to an edge of the support part 223 is larger than or equal to 2 mm. In this way, especially when the projecting member 220 is a metal member, the support part 223 is prevented from shrinking when the first light-transmission hole 221 is punched, which otherwise will affect the performance of the projecting member 220.

Moreover, the support part 223 is provided with a light-shielding protrusion 225, and the light-shielding protrusion 225 is projected upwards and arranged on the support part 223. The light-shielding protrusion 225 has a through hole 226 in communication with the first light-transmission hole 221. The light-shielding protrusion is configured to be fitted in the light-emitting assembly carried on the support part 223 so as to improve the connection stability between the light-emitting assembly and the support part 223.

Figure 5:
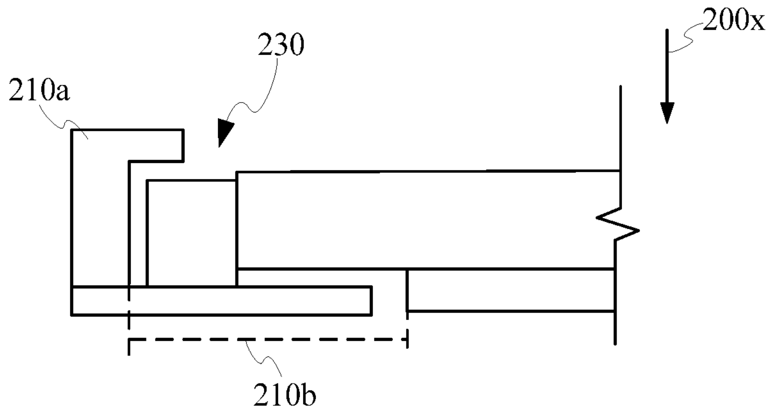
FIG. 5 is a partial cross-sectional view of a support bracket according to another illustrative embodiment of the present disclosure.

In an embodiment, the frame 210 includes a first segment and a second segment, the first segment is configured to be connected to the projecting member, and the second segment is configured to be fitted with the light source in the light-emitting assembly. FIG. 5 is a partially cross-sectional view of a support bracket according to another illustrative embodiment. As illustrated in FIG. 5, a second segment 210*a* includes an upper part and a lower part arranged along the given direction 200*x*. The upper part projects towards the mounting cavity 230 relatives to the lower part. Thus, the second segment 210*a* has an inverted "L" shape. In this way, the light source may be mounted below the upper part of the second segment 210*a*. Thus, the second segment 210*a* can shield the light source in the light-emitting assembly, and hence play the role of protecting the light source.

In some embodiments, the light source in the light-emitting assembly is arranged along an edge of the backlight module. In this case, the second segment 210*a* is one side 210*x* of the frame 210, and the first segment includes other sides 210*x* of the frame 210.

In summary, the support bracket provided by the embodiment of the present disclosure is used in the backlight module. The frame 210 of the support bracket 200 is configured to be connected to the light-emitting assembly in the backlight module, and the projecting member 220 is configured to support the light-emitting assembly, so that the support bracket 200 plays a role of mounting the light-emitting assembly.

Moreover, the projecting member 220 of the support bracket 200 projects towards the mounting cavity 230. In this case, the projecting member 220 does not block the mounting cavity 230. This significantly reduces the physical structure of the support bracket, thereby reducing the weight of the support bracket. Thus, the weight of the backlight module including the support bracket is reduced.

In addition, the projecting member 220 is provided with the first light-transmission hole 221, such that the support bracket 200 can be fitted with the backlight module in support of the display screen with an internal opening, thereby meeting the requirement for a high screen-to-body ratio of the display screen.

Figure 6:
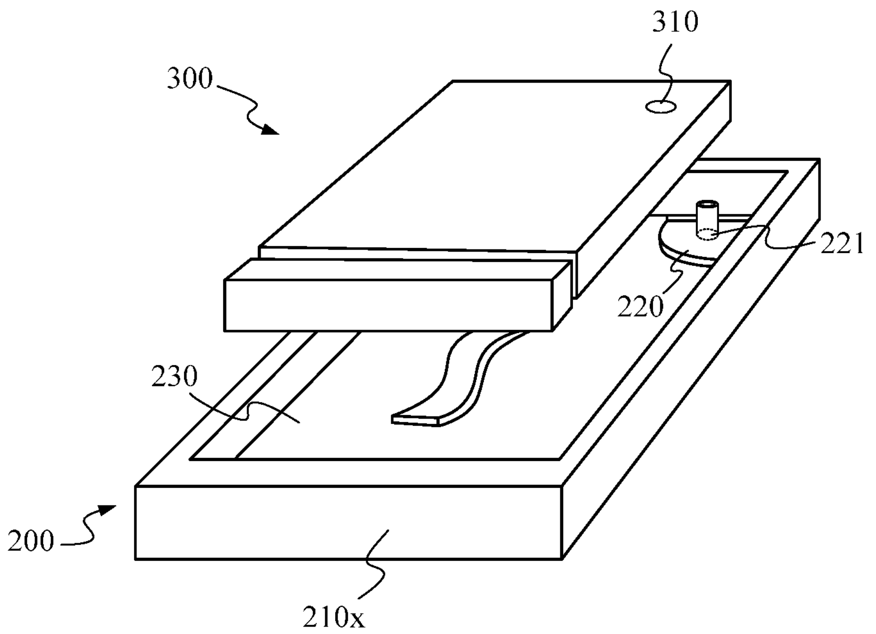
FIG. 6 is an exploded view of a backlight module according to an illustrative embodiment of the present disclosure.
Figures 1, 7:
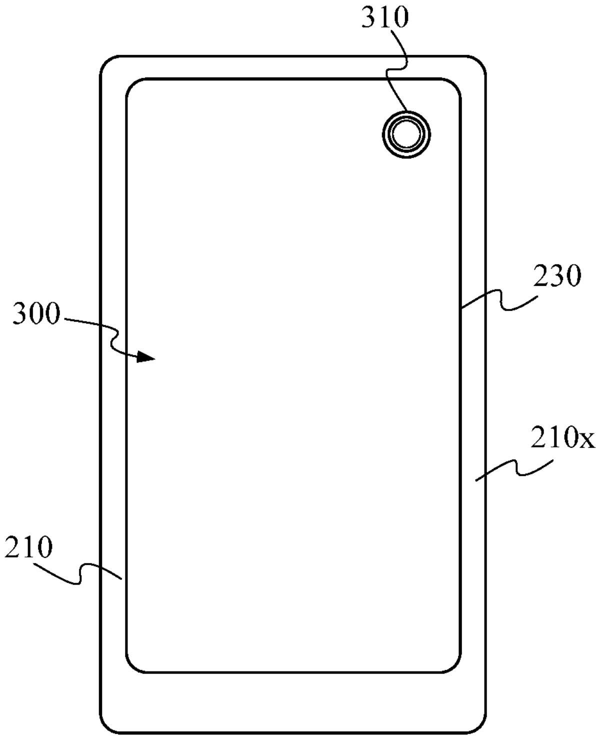
Figures 2, 7:
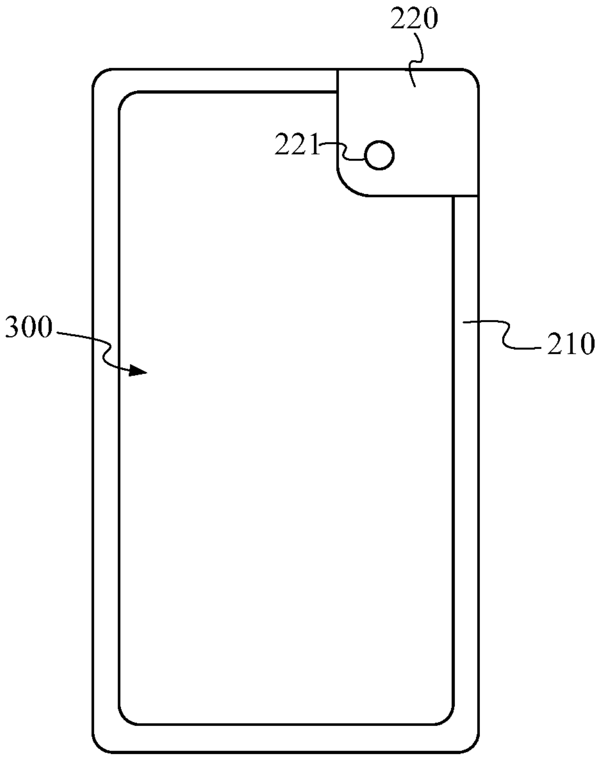

Based on the support bracket provided above, the embodiment of the present disclosure further provides a backlight module. FIG. 6 is an exploded view of a backlight module according to an illustrative embodiment of the present disclosure, FIGS. 7-1 and 7-2 are a top view and a bottom view of a backlight module according to an illustrative embodiment of the present disclosure, respectively.

As illustrated in FIG. 6, the backlight module includes the support bracket 200 provided above and a light-emitting assembly 300.

The light-emitting assembly 300 is provided with a second light-transmission hole 310 running therethrough in the up-and-down direction. In an embodiment of the present disclosure, the light-emitting assembly 300 is connected to the support bracket 200. In combination with FIGS. 7-1 and 7-2, the light-emitting assembly 300 is arranged in the mounting cavity 230, and is connected to the frame 210. Moreover, the light-emitting assembly 300 is overlapped on the projecting member 220 in such a manner that the second light-transmission hole 310 and the first light-transmission hole 221 are in communication with each other.

In this way, through the dual support of the frame 210 and the projecting member 220 for the light-emitting assembly 300, a stable connection between the support bracket 200 and the light-emitting assembly 300 can be ensured.

Based on the above, in the embodiment of the present disclosure, the projecting member 220 of the support bracket 200 can support the light-emitting assembly 300, and also is provided with the light-transmission hole fitted with the optical module, thereby meeting the requirement of the high screen-to-body ratio of the display screen. Moreover, compared with the support bracket 100 including the frame 110 and the base plate 120 in the related art, the physical structure of the support bracket 200 provided by the embodiments of the present disclosure is reduced through the frame 210 and the projection 220, so as to reduce the weight of the backlight module. Therefore, the weight of the liquid crystal display screen using the backlight module can be reduced.

Figure 8:
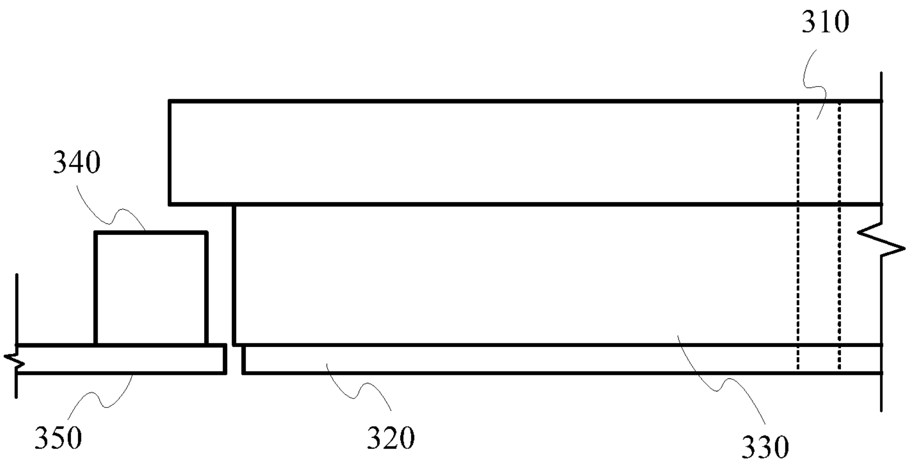
FIG. 8 is a schematic view of a light-emitting assembly according to an illustrative embodiment of the present disclosure.

FIG. 8 is a schematic view of a light-emitting assembly according to an illustrative embodiment of the present disclosure. As illustrated in FIG. 8, the light-emitting assembly 300 includes a reflecting member 320, a light guiding member 330 arranged on the reflecting member 320, a light source 340 located at a side of the light guiding member 330, a flexible circuit board 350 connected to the light source 340, and an optical device group (such as a diffusing sheet and a prism) arranged on the light guiding member 330. The second light-transmission hole 310 penetrates the optical device group, the light guiding member 330, and the reflecting member 320 from top to bottom.

In an embodiment, the reflecting member 320 is configured to be connected to the support bracket 200, and to support the light guiding member 330 and the optical device group in the light-emitting assembly 300.

Figure 9:
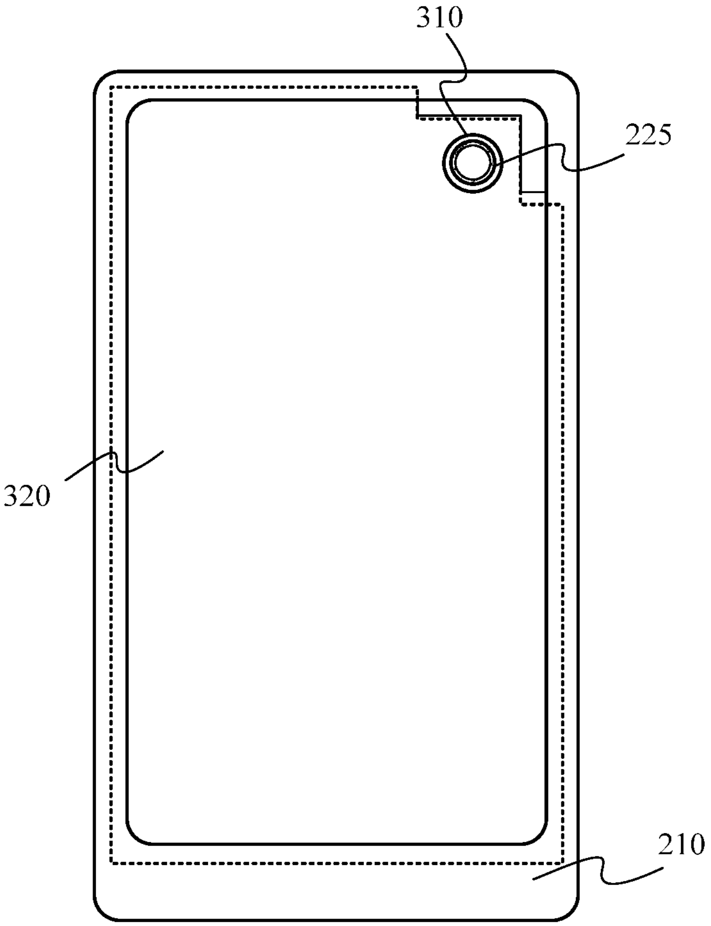
FIG. 9 is a top view of a light-emitting assembly and a support bracket after being connected to each other according to an illustrative embodiment of the present disclosure.

FIG. 9 is a top view of a light-emitting assembly and a support bracket after being connected to each other according to an illustrative embodiment of the present disclosure. As illustrated in FIG. 9, the reflecting member 320 is located below the frame 210, and the reflecting member 320 is connected to the bottom wall (not illustrated in FIG. 9) of the frame 210. Moreover, a lower surface of the reflecting member 320 is overlapped on the support part 223. Here, in combination with the structure of the support bracket 200, since the connection part 222 extends downwards, an space enough for arranging the reflecting member 320 therein is formed between the support part 223 and the bottom wall 213, such that the reflecting member 320 is connected to the bottom wall of the frame 210, and also is placed on the projecting member 220. In this way, the connection stability between the light-emitting assembly 300 and the support bracket 200 can be ensured by connecting the frame 210 to the reflecting member 320, and also connecting the projecting member 220 to the reflecting member 320.

Moreover, when the support part 223 of the projecting member 220 is provided with the light-shielding protrusion 225, the reflecting member 320 is fitted over the light-shielding protrusion 225 through the second light-transmission hole 310. In this way, the stable connection between the reflecting member 320 and the projecting member 220 can be further ensured through the light-shielding protrusion 225.

In addition, the whole light-emitting assembly 300 is fitted over the light-shielding protrusion 225 through the second light-transmission hole 310. The light-shielding protrusion 225 prevents the light output from the light-emitting assembly 300 from passing through the first light-transmission hole 221, thereby avoiding an interference with operations of the optical device group fitted with the first light-transmission hole 221. In some embodiments, a height of the light-shielding protrusion 225 is greater than or equal to a thickness of the light-emitting assembly 300, and a reflective coating is coated on an outer wall of the light-shielding protrusion 225.

Figure 10:
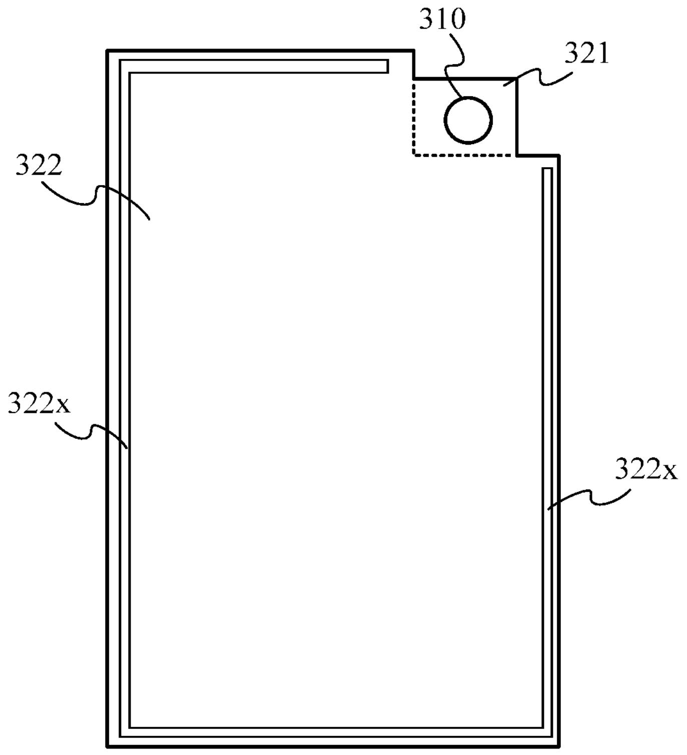
FIG. 10 is a top view of a reflecting member according to an illustrative embodiment of the present disclosure.

FIG. 10 is a top view of a reflecting member according to an illustrative embodiment of the present disclosure. In order to simplify the way of assembling the reflecting member 320 with the support bracket 200, the structure of the reflecting member 320 is improved in the embodiment of the present disclosure. As illustrated in FIG. 10, the reflecting member 320 includes a first portion 321 and a second portion 322. An edge of the first portion 321 is indented relative to an edge of the second portion 322. The first portion 321 is configured to be overlapped on the support part 223, while the second portion 322 is configured to be connected to the bottom wall of the frame. In some embodiments, an edge of the second portion 322 is provided with an adhesive tape 322*x* so as to be connected to the bottom wall of the frame 210.

The first portion 321 formed by indenting the edge is adopted. Thus, after the reflecting member 320 is overlapped on the support part, it can be inserted below the bottom wall of the frame 210, so as to facilitate a fine adjustment of a position of the reflecting member 320 relative to the support bracket 200, thus making a contribution to assembling.

In an embodiment, the frame 210 includes a first segment and a second segment, the first segment is configured to be connected to the reflecting member 320, the second segment is not connected to the reflecting member 320, and a mounting notch is formed between the second segment and the reflecting member 320.

Figure 11:
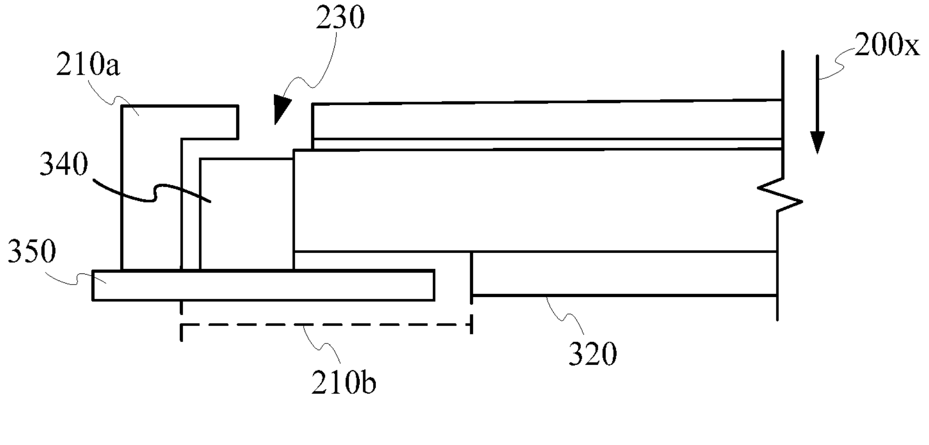
FIG. 11 is a cross-sectional view of a backlight module along a height direction according to an illustrative embodiment of the present disclosure.

FIG. 11 is a cross-sectional view of a backlight module along a height direction according to an illustrative embodiment of the present disclosure. As illustrated in FIG. 11, the reflecting member 320 does not extend to be below the second segment 210*a* of the frame 210, and a mounting notch 210*b* is formed between the reflecting member 320 and the second section 210*a*. The flexible circuit board 350 extends from the mounting notch 210*b* to the outside of the support bracket. That is, the flexible circuit board 350 is led out of the frame through the mounting notch 210*b*, and then connected to an external module. In some embodiments, the flexible circuit board 350 is connected to the bottom wall of the second segment 210*a* to further enhance the connection stability of the light-emitting assembly and the support bracket.

In addition, the upper portion of the second segment 210$a$ protrudes towards the mounting cavity 230 relative to the lower portion of the second segment 210$a$. In this case, the light-emitting assembly 300 is mounted in an inverse manner, and its light source 340 is located above the flexible circuit board 350. After the light-emitting assembly 300 is assembled with the support bracket 200, the light source 340 is arranged in the mounting cavity 230 and located below the upper portion of the second segment 210$a$. Thus, the frame 210 can ensure the structural stability of the light source 340 and prevent the light source 340 from being damaged by external forces.

FIG. 12 is a cross-sectional view of a backlight module along a height direction according to another illustrative embodiment of the present disclosure. In the manner illustrated in FIG. 12, a mounting notch does not need to be formed between the reflecting member 320 and the frame 210. The light-emitting assembly 300 is mounted in a normal manner, and its light source 340 is arranged below the flexible circuit board 350. After the light-emitting assembly 300 is assembled with the support bracket 200, the light source 340 is located in the mounting cavity 230, and the flexible circuit board 350 extends over the support bracket 200 to the outside of the support bracket 200 so as to be connected with external components.

In summary, in the backlight module provided by the embodiments of the present disclosure, the support bracket 200 is formed by using the frame 210 and the projecting member 220 to achieve the purpose of reducing the weight of the backlight module. The connection stability of the support bracket 200 and the light-emitting assembly 300 can be ensured by the connection manners of the frame 210 and the projecting member 220 with the reflecting member 320 of the light-emitting assembly 300. In addition, the backlight module provided by the embodiments of the present disclosure is adapted for the liquid crystal display screen with an internal opening so as to increase the screen-to-body ratio of the display screen.

Based on the backlight module provided by the above embodiments, the embodiment of the present disclosure provides an assembling method of the backlight module. The assembling method is specifically used for assembling the backlight module provided by the above embodiments. FIG. 13 is a flow chart of an assembling method of a backlight module according to an illustrative embodiment of the present disclosure. As illustrated in FIG. 13, the assembling method includes the following steps.

In step 131, the reflecting member of the light-emitting assembly is placed on the support part of the projecting member.

Specifically, step 131 includes the following actions. The reflecting member is obliquely inserted from a side of the mounting cavity away from the support part, and the light-shielding protrusion is fitted in the second light-transmission hole of the reflecting member. Since the second portion of the reflecting member needs to be connected to the bottom wall of the frame, at least one of the length or width of the second portion of the reflecting member is larger than the size of the mounting cavity of the frame. Therefore, in step 131, the reflecting member needs to be inclined towards an axial direction of the mounting cavity so as to be smoothly inserted into the mounting cavity.

In step 132, the reflecting member is connected to the bottom wall of the frame.

In some embodiments, an adhesive tape is pre-arranged on the reflecting member, or an adhesive is pre-coated on the bottom wall of the frame. In step 132, the reflecting member is bonded to the bottom wall of the frame by an external force. Moreover, when the frame includes the first segment and the second segment, the reflecting member only needs to be connected to the bottom wall of the first segment in step 132.

FIG. 14 is a flow chart of an assembling method of a backlight module according to another illustrative embodiment of the present disclosure. When the frame includes the first segment and the second segment, the assembling method further includes the following steps, as illustrated in FIG. 14.

In step 133, the light source and the flexible circuit board are placed into the mounting cavity of the support bracket from top of the support bracket, and the flexible circuit board extends out of the mounting cavity from the mounting notch formed between the second segment and the reflecting member.

In some embodiments, the light source, the flexible circuit board, and the light guiding member are pre-connected as a whole, and in step 133, the light source, the flexible circuit board, and the light guiding member all extend into the mounting cavity. The position is adjusted so that the light source is arranged below the upper portion of the second segment, and the light guiding member is located above the reflecting member.

In step 134, the flexible circuit board is connected to the bottom wall of the second segment.

In some embodiments, an adhesive tape is pre-arranged on the flexible circuit board or the bottom wall of the frame, or a glue is applied to connect the flexible circuit board to the bottom wall of the second segment after the flexible circuit board passes through the mounting notch, thus further strengthening the connection stability of the light-emitting assembly and the support bracket.

In addition, the optical device group such as the diffusing sheet and the prism in the light-emitting assembly are sequentially mounted on the light guiding member.

Based on the backlight module provided by the embodiment of the present disclosure, the embodiments of the present disclosure further provide a display screen and an electronic device.

The display screen includes the backlight module provided above, and a liquid crystal display panel. The liquid crystal display panel is arranged above the backlight module. In some embodiments, the display screen may adopt a chip on film (COF) packaging manner or a chip on glass (COG) packaging manner.

Due to the use of the backlight module provided by the embodiments of the present disclosure, the display screen may be fitted with an optical module such as a front camera and achieve a high screen-to-body ratio. Moreover, since the backlight module has the advantage of a light weight, the weight of the display screen using the backlight module is effectively reduced. After experimental tests, when the solution provided by the embodiments of the present disclosure is used, the weight of the backlight module of the same specification is reduced by 30% to 40%, and the weight of the display screen of the same specification is reduced by 10% to 15%.

The electronic device includes the display screen provided above. The type of the electronic device includes, but is not limited to, a mobile phone, a tablet computer, a wearable device (a smart bracelet, a smart watch, etc.), a medical device, etc. By adopting the backlight module provided by the embodiments of the present disclosure, compared with the electronic device having the display screen of the same size in the related art, the embodiments of the present disclosure reduce the overall weight of the electronic device by reducing the weight of the display screen, which is convenient for a user to hold or carry the electronic device for a long time.

Other embodiments of the present disclosure will be apparent to those skilled in the art from consideration of the specification and practice of the present disclosure. The present disclosure is intended to cover any variations, usages, or adaptations of the present disclosure which follow general principles of the present disclosure and include common knowledge or customary technical means in the related art that is not disclosed by the present disclosure. It is intended that the specification and examples should be considered to be illustrative only, while a true scope and a spirit of the present disclosure are indicated by appended claims.

What is claimed is:

1. A support bracket for a backlight module comprising: a frame connected to and accommodating a light-emitting assembly of the backlight module; the frame forming a through opening that is a mounting cavity for the backlight module; and a projecting member connected to the frame, said projecting member having a support part partially projecting into the mounting cavity and supporting the light-emitting assembly in the backlight module, the support part having a first hole and a light-shielding protrusion, the light-shielding protrusion having a through-hole, and the light-emitting assembly is provided with a second hole, such that the second hole is aligned and overlapped with the first hole and the light-shielding protrusion is fitted in the second hole.

2. The support bracket according to claim 1, wherein the frame comprises an inner wall facing towards the mounting cavity, an outer wall opposite to the inner wall, and a bottom wall connected to the inner wall and the outer wall; wherein the projecting member comprises: a connection part connected to at least one of the outer wall and the bottom wall, and extending in a direction running away from the frame; and the support part arranged below the bottom wall, connected to the connection part and projecting towards the mounting cavity.

3. The support bracket according to claim 2, wherein the support part is provided with the first hole and the light-shielding protrusion, the light-shielding protrusion has a through hole in communication with the first hole, and the light-shielding protrusion is fitted in the light-emitting assembly supported by the projecting member.

4. The support bracket according to claim 3, wherein a distance from an edge of the support part to the first hole is greater than or equal to 2 mm.

5. The support bracket according to claim 1, wherein the frame comprises:

a first segment connected to the projecting member; and a second segment comprising an upper portion and a lower portion arranged in the given direction, the upper portion projecting towards the mounting cavity relative to the lower portion.

6. A backlight module comprising a light-emitting assembly and a support bracket, the support bracket comprising: a frame connected to and accommodating a light-emitting assembly of the backlight module; the frame forming a through opening that is a mounting cavity for the backlight module; and a projecting member connected to the frame, said projecting member having a support part partially projecting into the mounting cavity without completely blocking a bottom opening of the mounting cavity and supporting the light-emitting assembly in the backlight module, the support part having a first hole and a light-shielding protrusion, the light-shielding protrusion having a through-hole, and the light-emitting assembly is provided with a second hole, such that the second hole is aligned and overlapped with the first hole and the light-shielding protrusion is fitted in the second hole; wherein the light-emitting assembly is arranged in the mounting cavity of the support bracket, and is connected to the frame of the support bracket; and the light-emitting assembly is provided with a second hole, and is overlapped on the projecting member of the support bracket in such a manner that the second hole is in communication with the first hole in the support bracket, wherein the frame comprises a bottom wall; the light-emitting assembly comprises a reflecting member connected to the bottom wall of the frame and overlapped on the support part, wherein the reflecting member is located below the bottom wall of the frame.

7. The backlight module according to claim 6, wherein the frame comprises a first segment and a second segment, and a mounting notch is formed between the second segment and the reflecting member;

the light-emitting assembly further comprises a light source and a flexible circuit board connected to the light source, the light source is arranged in the mounting cavity, and the flexible circuit board extends from the mounting notch to an outside of the support bracket.

8. The backlight module according to claim 7, wherein the second segment comprises an upper portion and a lower portion, and the light source is arranged below the upper portion in the mounting cavity.

9. The backlight module according to claim 7, wherein the flexible circuit board is connected to a bottom wall of the second segment.

10. The backlight module according to claim 6, wherein the reflecting member comprises a first portion and a second portion, an edge of the first portion is indented relative to an edge of the second portion;

the first portion is overlapped on the support part, and the second portion is connected to the bottom wall of the frame.

11. The backlight module according to claim 6, wherein the support part is provided with the light-shielding protrusion, the reflecting member is provided with the second hole, and the light-shielding protrusion is fitted in the second hole of the reflecting member.

12. The backlight module according to claim 6, wherein the light-emitting assembly further comprises a light source and a flexible circuit board connected to the light source;

the light source is arranged in the mounting cavity, and the flexible circuit board extends over the support bracket to an outside of the support bracket.

13. A display screen comprising a backlight module, the backlight module comprising a light-emitting assembly and a support bracket, the support bracket comprising: a frame connected to and accommodating a light-emitting assembly of the backlight module; the frame forming a through opening that is a mounting cavity for the backlight module; and a projecting member connected to the frame, said projecting member having a support part partially projecting into the mounting cavity without completely blocking a bottom opening of the mounting cavity and supporting the light-emitting assembly in the backlight module, the support part having a first hole and a light-shielding protrusion, the light-shielding protrusion having a through-hole, and the light-emitting assembly is provided with a second hole, such that the second hole is aligned and overlapped with the first hole and the light-shielding protrusion is fitted in the second hole; wherein the light-emitting assembly is arranged in the mounting cavity of the support bracket, and is connected to the frame of the support bracket; and the light-emitting assembly is provided with a second hole, and is overlapped on the projecting member of the support bracket in such a manner that the second hole is in communication with the first hole in the support bracket, wherein the frame comprises a bottom wall; the light-emitting assembly comprises a reflecting member connected to the bottom wall of the frame and overlapped on the support part, wherein the reflecting member is located below the bottom wall of the frame.

14. The display screen according to claim 13, wherein the frame comprises a first segment and a second segment, and a mounting notch is formed between the second segment and the reflecting member;

the light-emitting assembly further comprises a light source and a flexible circuit board connected to the light source, the light source is arranged in the mounting cavity, and the flexible circuit board extends from the mounting notch to an outside of the support bracket.

15. The display screen according to claim 14, wherein the second segment comprises an upper portion and a lower portion, and the light source is arranged below the upper portion in the mounting cavity.

16. The display screen according to claim 13, wherein the reflecting member comprises a first portion and a second portion, an edge of the first portion is indented relative to an edge of the second portion;

the first portion is overlapped on the support part, and the second portion is connected to the bottom wall of the frame.

17. The display screen according to claim 13, wherein the support part is provided with the light-shielding protrusion, the reflecting member is provided with the second hole, and the light-shielding protrusion is fitted in the second hole of the reflecting member.

18. The display screen according to claim 13, wherein the light-emitting assembly further comprises a light source and a flexible circuit board connected to the light source;

the light source is arranged in the mounting cavity, and the flexible circuit board extends over the support bracket to an outside of the support bracket.

* * * * *